US012759055B2

(12) United States Patent
Yamamoto

(10) Patent No.: US 12,759,055 B2

(45) Date of Patent: Oct. 13, 2026

(54) CUTTING INSERT, ROTARY TOOL, AND METHOD FOR MANUFACTURING MACHINED PRODUCT

(71) Applicant: KYOCERA CORPORATION, Kyoto (JP)

(72) Inventor: Masahiro Yamamoto, Ritto (JP)

(73) Assignee: KYOCERA CORPORATION, Kyoto (JP)

(*) Notice: Subject to any disclaimer, the term of this patent is extended or adjusted under 35 U.S.C. 154(b) by 713 days.

(21) Appl. No.: 18/246,680

(22) PCT Filed: Sep. 28, 2021

(86) PCT No.: PCT/JP2021/035635

§ 371 (c)(1),
(2) Date: Mar. 27, 2023

(87) PCT Pub. No.: WO2022/065510

PCT Pub. Date: Mar. 31, 2022

(65) Prior Publication Data

US 2023/0364684 A1 Nov. 16, 2023

(30) Foreign Application Priority Data

Sep. 28, 2020 (JP) ................................ 2020-162137

(51) Int. Cl.

*B23C 5/10* (2006.01)
*B23B 27/14* (2006.01)

(Continued)

(52) U.S. Cl.

CPC ........ *B23B 27/141* (2013.01); *B23B 2200/08* (2013.01); *B23B 2200/28* (2013.01); *B23B 2251/14* (2013.01); *B23B 2251/40* (2013.01)

(58) Field of Classification Search

CPC ............ B23B 2200/08; B23B 2200/28; B23B 251/40; B23B 27/141; B23B 2251/04;

(Continued)

(56) References Cited

U.S. PATENT DOCUMENTS 7,237,986 B2 * 7/2007 Anjanappa ............. B23B 51/02 408/230
8,556,547 B2 * 10/2013 Takagi ...................... B23C 5/10 407/62

(Continued)

FOREIGN PATENT DOCUMENTS

JP 2004141975 A * 5/2004
JP 2008514836 A 5/2008

(Continued)

*Primary Examiner* — Sara Addisu

(74) *Attorney, Agent, or Firm* — HAUPTMAN HAM, LLP

(57) ABSTRACT

An insert includes a main body extending from a first end toward a second end. The main body includes a cutting edge, a rake face, and a flute. In the rake face, a second rake angle of a second surface region positioned closer to the second end than a first surface region connected to the cutting edge is smaller than a first rake angle of the first surface region. A third rake angle of a third surface region is smaller than the second rake angle, the third surface region being adjacent to the flute rearward in a rotational direction and on an outer peripheral side of the main body.

12 Claims, 10 Drawing Sheets

(51) Int. Cl.
*B23B 51/02* (2006.01)
*B23C 5/16* (2006.01)

(58) Field of Classification Search
CPC .......... B23B 2251/082; B23B 2251/14; B23B 2251/202; B23B 51/0005; B23C 2210/54; B23C 5/10; B23C 2210/02
See application file for complete search history.

(56) References Cited

U.S. PATENT DOCUMENTS

| | | | | |
|---|---|---|---|---|
| 10,259,050 | B2 * | 4/2019 | Ogawa | B23B 51/02 |
| 2006/0029477 | A1 | 2/2006 | Anjanappa et al. | |
| 2007/0169965 | A1 | 7/2007 | Moser et al. | |
| 2012/0039677 | A1 * | 2/2012 | Davis | B23C 5/10<br>407/62 |
| 2017/0182566 | A1 | 6/2017 | Dyer et al. | |
| 2020/0114434 | A1 | 4/2020 | Ogawa et al. | |

FOREIGN PATENT DOCUMENTS

| | | | | |
|---|---|---|---|---|
| JP | 2019501787 | A | 1/2019 | |
| JP | 2020104202 | A | 7/2020 | |
| WO | 2018221737 | A1 | 12/2018 | |
| WO | WO-2022224832 | A1 * | 10/2022 | B23B 27/06 |

* cited by examiner

V-V CROSS SECTION

VI-VI CROSS SECTION

VII-VII CROSS SECTION

VIII-VIII CROSS SECTION

IX-IX CROSS SECTION

CUTTING INSERT, ROTARY TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2021/035635 filed on Sep. 28, 2021, which claims priority to Japanese Patent Application No. 2020-162137, filed on Sep. 28, 2020.

TECHNICAL FIELD

The present disclosure relates to a cutting insert used in machining for a workpiece, a rotary tool, and a method for manufacturing a machined product.

BACKGROUND OF INVENTION

As a rotary tool used when machining a workpiece made of metal or the like, a drill bit disclosed in Patent Document 1 is known, for example. The drill bit described in Patent Document 1 has a cutting edge, a rake face, and a helical flute (flute). When the rotating drill bit is brought into contact with the workpiece to perform drilling, chips produced by the cutting edge are curled in the rake face and discharged to the outside of the workpiece through the flute.

CITATION LIST

Patent Literature

Patent Document 1: JP 2019-501787 T

SUMMARY

A cutting insert as one non-limiting example includes a main body extending from a first end toward a second end along a rotational axis. The main body includes: a cutting edge positioned on a side of the first end; a rake face extending from the cutting edge toward the second end; and a flute extending from the rake face toward the second end. The rake face includes: a first surface region connected to the cutting edge and having a first rake angle; a second surface region positioned closer to the second end than the first surface region and having a second rake angle; and a third surface region positioned closer to the second end than the second surface region and having a third rake angle. The flute is positioned closer to the second end than the second surface region is. The third surface region is adjacent to the flute rearward in a rotational direction about the rotational axis and on a side of an outer peripheral of the main body. The second rake angle is smaller than the first rake angle, and the third rake angle is smaller than the second rake angle.

DESCRIPTION OF EMBODIMENTS

Figure 1:
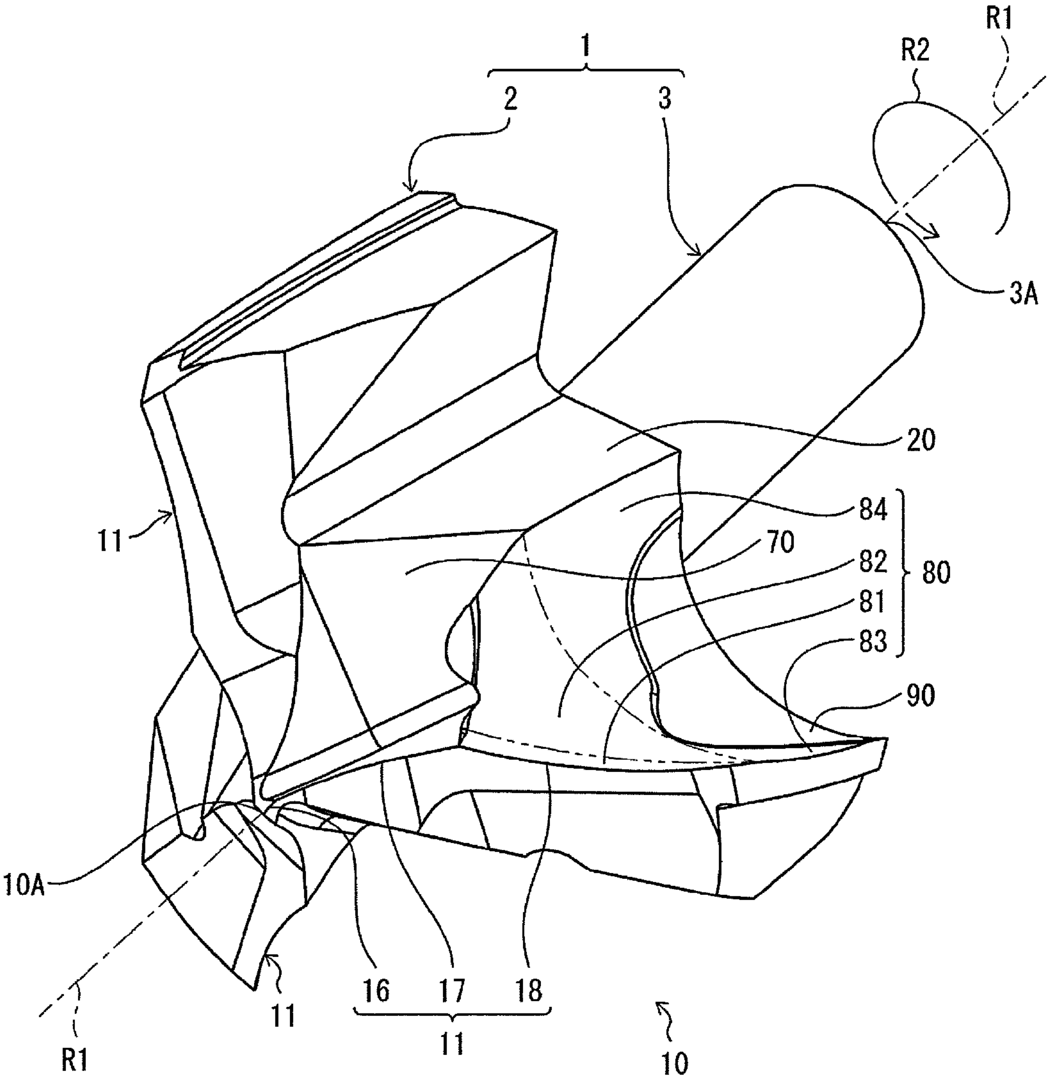
FIG. 1 is a perspective view of a cutting insert according to a non-limiting embodiment of the present disclosure.

Detailed description will be given below of a cutting insert (hereinafter, also simply referred to as an insert), a rotary tool, and a method for manufacturing a machined product of a non-limiting embodiment of the present disclosure with reference to the diagrams. However, for convenience of explanation, each of the drawings referenced below is simplified to illustrate only the main members necessary to describe the embodiment. Accordingly, the insert and the rotary tool may be provided with any constituent member that is not illustrated in each of the drawings referenced in this specification. The dimensions of the members in the drawings do not faithfully represent the actual dimensions of the constituent members, the dimension ratios of the members, or the like.

1. Overview of Insert

Figure 2:
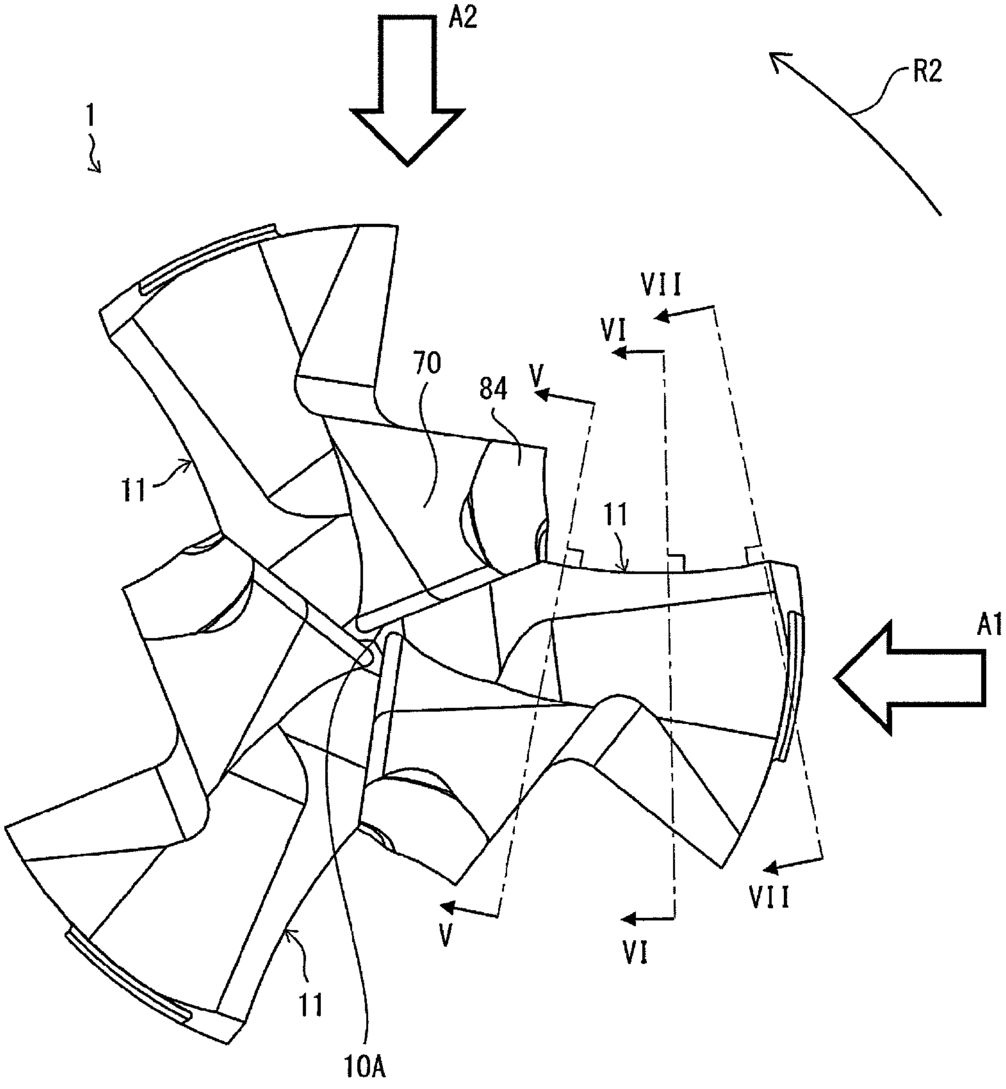
FIG. 2 is a front view of the cutting insert illustrated in FIG. 1 as viewed from a first end side.
Figure 3:
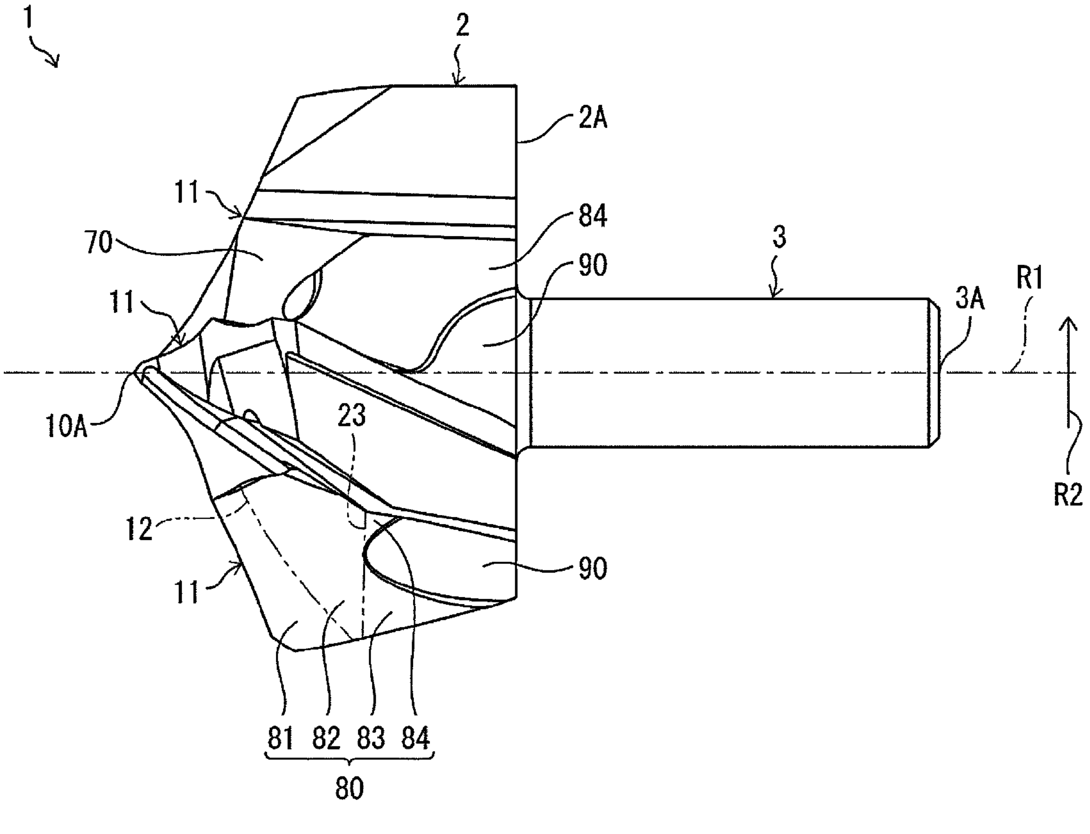
FIG. 3 is a side view of the cutting insert illustrated in FIG. 1 as viewed in an A1 direction in FIG. 2.
Figure 4:
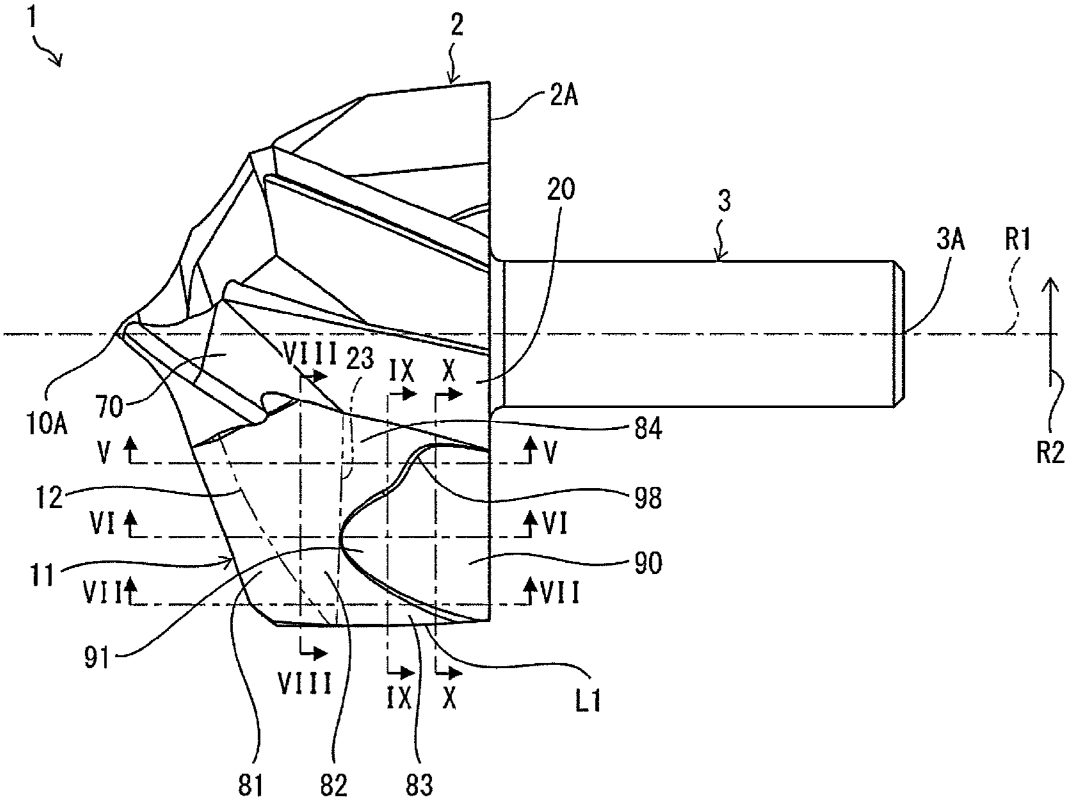
FIG. 4 is a plan view of the cutting insert illustrated in FIG. 1 as viewed in an A2 direction in FIG. 2.

First, an overview of an insert 1 of an embodiment is described with reference to FIG. 1 to FIG. 4. FIG. 1 is a perspective view of the insert 1. FIG. 2 is a front view of the insert 1 as viewed from side of a first end 10A. FIG. 3 is a side view of the insert 1 as viewed in an A1 direction in FIG. 2. FIG. 4 is a plan view of the insert 1 as viewed in an A2 direction in FIG. 2.

As illustrated in FIGS. 1 to 4, the insert 1 of the present example includes a main body 2 that extends from the first end 10A toward a second end 3A along a rotational axis R1 and is positioned on the first end 10A side, and a shaft portion 3 positioned on the second end 3A side.

The insert 1 has the cutting portion 10 formed on the first end 10A side of the main body 2. The cutting portion 10 is a portion that comes into contact with a workpiece T that is a process target (see FIG. 13) in machining (drilling) described below and is a portion that plays a main role in the machining. The main body 2 including the cutting portion 10 will be described in detail below.

The insert 1 is rotatable about the rotational axis R1 when cutting the workpiece. An arrow R2 illustrated in FIG. 1 and the like illustrated around the rotational axis R1 indicates the rotational direction of the insert 1. An end portion (that is, the leading end of the insert 1) of the cutting portion 10 in a direction along the rotational axis R1 is referred to as the first end 10A, and an end portion (that is, the trailing end of the insert 1) of the shaft portion 3 remote from the cutting portion 10 in the direction along the rotational axis R1 is referred to as the second end 3A.

The shaft portion 3 extends along the rotational axis R1. The shaft portion 3 may be used as a portion held by a holder 102 described below, by being fitted and fixed in a pocket 111 provided to the holder 102, when the insert 1 is attached to the holder 102 (see FIG. 11 and FIG. 12 and the like).

The size of the shaft portion 3 is not particularly limited, and the maximum width of the shaft portion 3 in a direction orthogonal to the rotational axis R1 may be set to, for example, about 3 to 10 mm. The dimension of the shaft portion 3 in a direction along the rotational axis R1 (longitudinal direction) may be set from about 3 to 10 mm for example.

The size of the main body 2 is also not particularly limited. A diameter of a virtual circle drawn with the rotational axis R1 being the center point to be in contact with the outer edge of the main body 2 in a front view of the main body 2 from the first end 10A side in a direction parallel to the rotational axis R1 may be set to be about 10 to 40 mm for example. The dimension of the main body 2 in a direction along the rotational axis R1 from the first end 10A to a trailing end of the main body 2 (a connection portion between the main body 2 and the shaft portion 3) may be set to be about 5 to 20 mm for example.

The main body 2 and the shaft portion 3 in the insert 1 may be formed separately and joined together or may be formed integrally.

2. Definitions of Terms

Note that, in the present specification, the description of "flat" or "flat surface" intends to mean that the surface is not a curved surface at a visible level or does not have unevenness at a visible level. Thus, for a surface referred to as being "flat" or "flat surface", an unavoidable degree of unevenness may be allowed in the manufacture of insert 1. Specifically, unevenness with a surface roughness of about 50 μm may be allowed for example. The "rotational axis" can also be expressed as a straight line (center line, center axis) passing through (i) the first end 10A and (ii) the center or substantially the center of a surface of the second end 3A of the shaft portion 3.

The front view in FIG. 2 illustrates the insert 1 as viewed from the first end 10A side. The diagram of the insert 1 as viewed from the first end 10A side in parallel to the rotational axis R1 will be referred to as front view.

In the side view in FIG. 3 and the plan view in FIG. 4, the insert 1 as viewed in directions perpendicular to the rotational axis R1 is illustrated. The diagram of the insert 1 as viewed in a direction perpendicular to the rotational axis R1 will be referred as a side view.

3. Details of Insert

With known drill bits (see, for example, Patent Document 1), attempts have been made to control the chips into a desired shape in the rake face. Unfortunately, the attempt to control the chips into a desired shape may result in an unstable flow direction of the chips.

Specifically, the chips may fail to flow toward the flute and may instead flow in a direction toward the outer peripheral direction (direction toward the outer portion) of the drill bit, and thus may damage a process surface (inner wall of the hole drilled) of the workpiece.

The cutting insert according to an aspect of the present disclosure is configured to facilitate the flow of the chips toward the flute.

Figure 5:
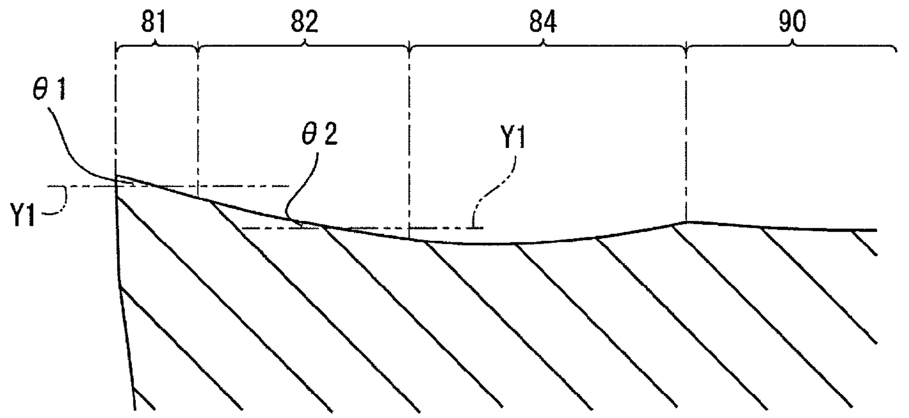
FIG. 5 is a cross-sectional view taken along line V-V indicated by arrows in FIG. 2.
Figure 6:
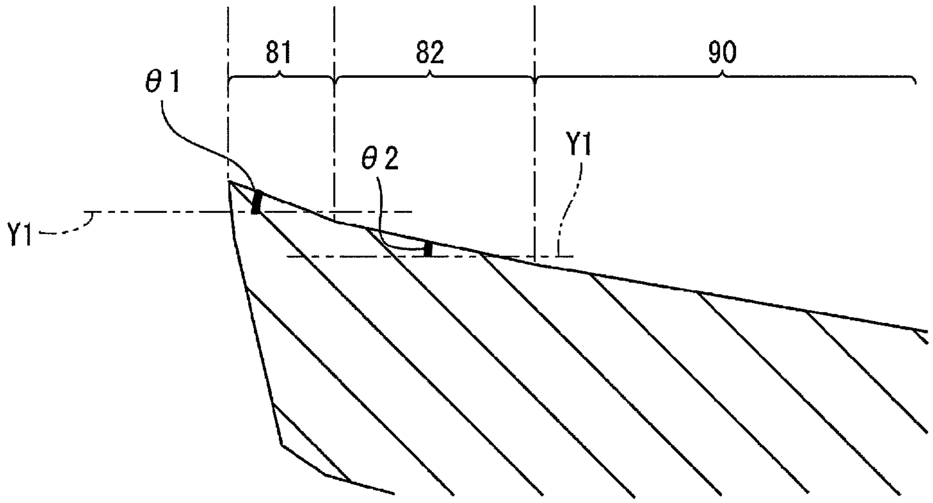
FIG. 6 is a cross-sectional view taken along line VI-VI indicated by arrows in FIG. 2.
Figure 7:
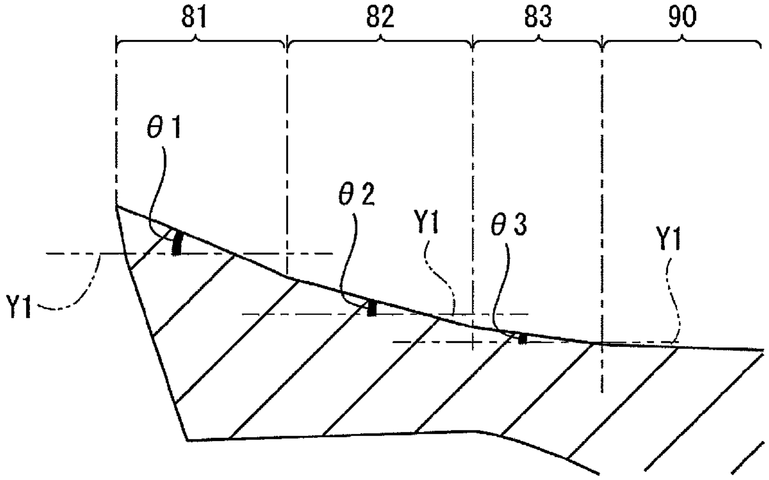
FIG. 7 is a cross-sectional view taken along line VII-VII indicated by arrows in FIG. 2.
Figure 8:
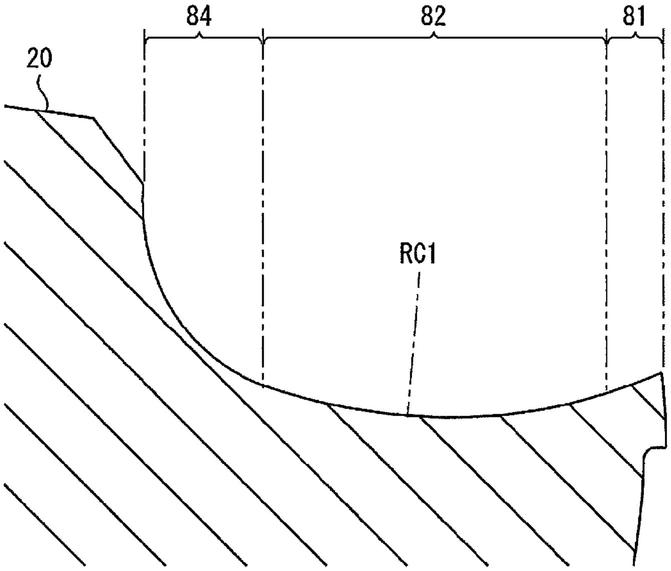
FIG. 8 is a cross-sectional view taken along line VIII-VIII indicated by arrows in FIG. 4.
Figure 9:
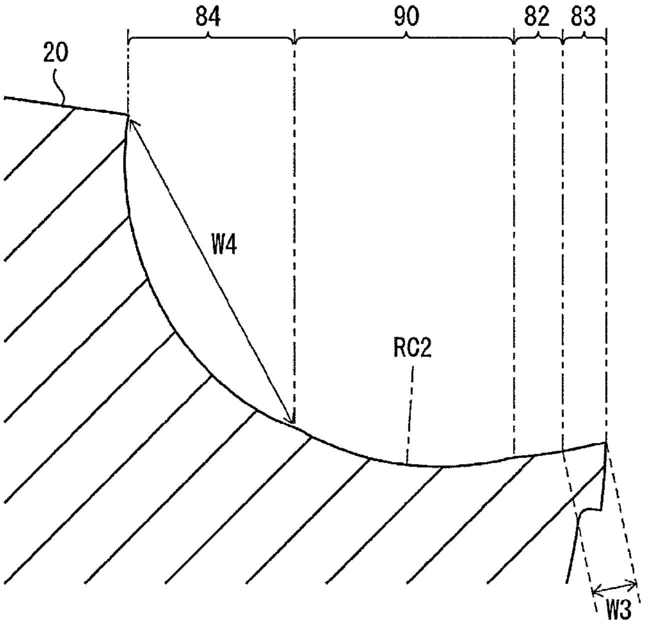
FIG. 9 is a cross-sectional view taken along line IX-IX indicated by arrows in FIG. 4.
Figure 10:
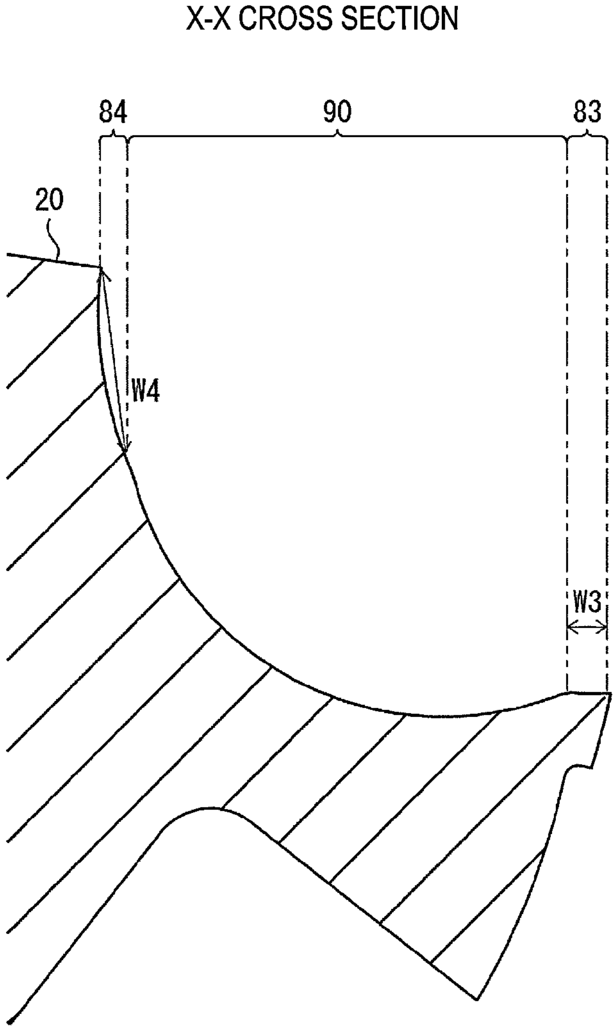
FIG. 10 is a cross-sectional view taken along line X-X indicated by arrows in FIG. 4.

Details of the insert 1 will be described using FIGS. 1 to 10. FIGS. 5 to 7 are cross-sectional views respectively taken along lines V-V, VI-VI, and VII-VII indicated by arrows in FIG. 2. FIGS. 8 to 10 are cross-sectional views respectively taken along lines VIII-VIII, IX-IX, and X-X indicated by arrows in FIG. 4. These lines V-V, VI-VI, and VII-VII are orthogonal to the cutting edge 11 in the insert 1 as viewed from the first end 10A side.

These lines V-V, VI-VI, and VII-VII in FIG. 4 are for reference to facilitate understanding of the cross-sectional views in FIGS. 5 to 7, as viewed in a direction indicated by arrows. The cross sections illustrated in FIGS. 5 to 7 are parallel to the rotational axis R1, but is not perpendicular to the plane in the side view illustrated in FIG. 4 (see FIG. 2). On the other hand, the cross sections illustrated in FIGS. 8 to 10 are parallel to the rotational axis R1 and perpendicular to the plane in side view illustrated in FIG. 4.

As illustrated in FIGS. 1 to 10, the main body 2 of the insert 1 includes the cutting edge 11 positioned on the first end 10A side, a rake face 80 extending from the cutting edge 11 toward the second end 3A, and flutes 90 extending from the rake face 80 toward the second end 3A. The rake face 80 may extend from the cutting edge 11 toward the second end 3A, and the flutes 90 may extend from the rake face 80 toward the second end 3A. The main body 2 may include an end surface 2A positioned on the second end 3A side and a ridge line where the flutes 90 and the end surface 2A intersect.

The cutting edge 11 may include a chisel edge 16 extending toward the outer peripheral of the cutting portion 10 from the position of the rotational axis R1 (that is, position of the first end 10A), a thinning edge 17 extending toward the outer peripheral from the chisel edge 16, and a main cutting edge 18 extending toward the outer peripheral from the thinning edge 17. The cutting portion 10 may have a thinning surface 70 extending from the thinning edge 17 toward the second end 3A (the second end 3A side).

The rake face 80 extends from the main cutting edge 18 toward the second end 3A, and curls chips produced by the cutting edge 11. The chips curled with the rake face 80 flow toward the flute 90. The rake face 80 may include a first surface region 81, a second surface region 82, a third surface region 83, and a fourth surface region 84.

As illustrated in FIGS. 1 and 4, the first surface region 81 may be a surface that is connected to the main cutting edges 18, and have a gently curved shape corresponding to the shape of the ridge where the main cutting edge 18 is formed.

The second surface region 82 is connected to the first surface region 81, positioned closer to the second end 3A than the first surface region 81, and connected to the third surface region 83, the fourth surface region 84, and the flutes 90. The second surface region 82 is inclined with respect to the first surface region 81. A boundary 12 between the second surface region 82 and the first surface region 81 may extend and be inclined toward the second end 3A as getting closer to the outer peripheral of the main body 2 in side view.

The second surface region 82 may be a surface having a shape (concavely curved shape) slightly convexly curved downward in a cross-section orthogonal to the rotational axis RE The second surface region 82 may be a surface having a linear shape in a direction along the rotational axis R1, or may be a surface having a shape convexly curved downward.

The third surface region 83 is positioned closer to the second end 3A than the second surface region 82, and is adjacent to the flute 90 rearward in the rotational direction about the rotational axis R1 and on the side close to the outer peripheral of the main body 2. In other words, the third surface region 83 is a portion defined by the second surface region 82, the flute 90, and a ridge L1 positioned at the intersection between the rake face 80 and the outer peripheral surface of the main body 2.

The third surface region 83 is inclined with respect to the second surface region 82. In side view of the main body 2, a boundary 23 between the second surface region 82 and the third surface region 83 may extend to pass through an end portion of the flute 90 closest to the first end 10A, and to be orthogonal to the rotational axis RE The third surface region 83 may have a smaller rake angle than the second surface region 82 as will be described in detail below. Thus, an end portion of the chips produced by the cutting edge 11 in the width direction is likely to come into contact with the third surface region 83.

The fourth surface region 84 is positioned closer to the second end 3A than the second surface region 82, and is adjacent to the flute 90 frontward in the rotational direction about the rotational axis RE The fourth surface region 84 is inclined with respect to the second surface region 82. The fourth surface region 84 is connected to a contact surface 20 that comes into contact with a fix claw 105 (see FIG. 12) of the holder 102 when the insert 1 is attached to the holder 102 described below. The fourth surface region 84 is a curved surface having a shape curved in such a manner as to stand from the flute 90 toward the contact surface 20.

The flute 90 is positioned closer to the second end 3A than the second surface region 82. The boundary between the flute 90 and the rake face 80 is referred to as a boundary 98. The flute 90 may have a helical shape toward the rear in a rotational direction R2 as getting closer to the second end 3A. In this case, a ridge is formed at the boundary between the flute 90 and the rake face 80, and thus this ridge serves as the boundary 98. The flute 90 may have a concavely curved shape in a cross section orthogonal to the rotational axis R1 for the sake of smooth discharging of the chips, flowing from the rake face 80, toward the second end 3A side.

In the insert 1 of the present example, as illustrated in FIGS. 5 to 7, the rake angle of the first surface region 81 is defined as a first rake angle θ1, the rake angle of the second surface region 82 is defined as a second rake angle θ2, and the rake angle of the third surface region 83 is defined as a third rake angle θ3.

The rake angles can be defined in cross sections (for example, cross sections taken along lines V-V, VI-VI, and VII-VII illustrated in FIG. 2) parallel to the rotational axis R1 and orthogonal to the relevant portion of the cutting edge 11 in front view. For example, the rake angles can be defined as angles formed between a virtual straight line Y1 parallel to the rotational axis R1 and the first surface region 81 to the fourth surface region 84 of the rake face 80 in the cross sections illustrated in FIGS. 5 to 7. Specifically, the first rake angle θ1 is an angle between the virtual straight line Y1 and the first surface region 81, the second rake angle θ2 is an angle between the virtual straight line Y1 and the second surface region 82, and the third rake angle θ3 is an angle between the virtual straight line Y1 and the third surface region 83. In FIGS. 5 to 7, the virtual straight line Y1 is illustrated with the height position varied as appropriate for convenience sake.

For example, when the slope of the line of the first surface region 81 is constant (the first rake angle θ1 is constant) in the cross section illustrated in FIG. 5, the value of the first rake angle θ1 is obtained based on the virtual straight line Y1 passing through any point of the first surface region 81 and the slope of the first surface region 81 at the point.

On the other hand, for example, the slope of the line of the first surface region 81 may not be constant in the cross section illustrated in FIG. 5, and the angle formed between the line of the first surface region 81 and the virtual straight line Y1 may vary depending on the height position of the virtual straight line Y1. In this case, the height position of the virtual straight line Y1 is changed, and the maximum value of the angles between the line of the first surface region 81 and the virtual straight lines Y1 is defined as the first rake angle θ1.

The values of the respective rake angles of the first surface region 81 to the third surface region 83 are compared in the same cross section. This is because, for example, the absolute value of the first rake angle θ1 may vary among the plurality of cross sections illustrated in FIGS. 5 to 7.

In the cross sections illustrated in FIGS. 5 to 7, the value of the rake angle is determined based on the virtual straight line Y1. Specifically, in the cross sections illustrated in FIGS. 5 to 7, an angle formed by a straight line parallel to the virtual straight line Y1 is defined as 0°. An acute angle between the virtual straight line Y1 and a straight inclined in the clockwise direction with respect to the virtual straight line Y1 is defined as a positive value, and an acute angle between the virtual straight line Y1 and a straight inclined in the counterclockwise direction with respect to the virtual straight line Y1 is defined as a negative value.

The definition of the rake angle and the rule for comparison between a plurality of rake angles similarly apply to the second rake angle θ2 and the third rake angle θ3.

In the insert 1 of the present example, the second rake angle θ2 is smaller than the first rake angle θ1, and the third rake angle θ3 is smaller than the second rake angle θ2. This expression "the third rake angle θ3 is smaller than the second rake angle θ2" includes a case where the second rake angle θ2 is a positive value and the third rake angle θ3 is a negative value.

A difference between the first rake angle θ1 and the second rake angle θ2 may be about 1°, or may be in a range from 0.3° to 10°, both inclusive, for example. A difference between the second rake angle θ2 and the third rake angle θ3 may be about 1°, or may be in a range from 0.3° to 10°, both inclusive, for example. About 1° means 1°±0.1°.

The insert 1 of the present example provides the following effects. Specifically, when the insert 1 comes into contact with the workpiece while rotating about the rotational axis R1, the workpiece is cut and processed by the cutting edge 11, thus forming chips of the workpiece along the cutting edge 11. As illustrated in FIGS. 4 and 6, the chips passing from a center portion of the main cutting edge 18 toward the second end 3A advance from the first surface region 81 to the flute 90 through the second surface region 82.

Furthermore, of the chips, those in the vicinity of the outer peripheral of the insert 1 advance to the first surface region 81, the second surface region 82, and the third surface region 83 in this order. With the rake angle varying to gradually decrease from the first surface region 81 to the third surface region 83 as illustrated in FIG. 7, the chips can be favorably curled.

In this case, a brake is applied to the chips advancing, thereby causing curling of the chips at the rake face 80. On the other hand, the chips are likely to advance more smoothly in the flute 90 than at the rake face 80, because the flute 90 has a helical shape toward the rear in the rotational direction R2 as getting closer to the second end 3A.

As described above, the third surface region 83 is adjacent to the flute 90 rearward in the rotational direction about the rotational axis R1 and on the side close to the outer peripheral of the main body 2. Thus, in the insert 1 of the present example, the chips are likely to be twisted in a portion around the outer peripheral of the insert 1. Thus, the chips are less likely to jump out from the insert 1, and are likely to flow toward the flute 90.

In particular, in the insert 1 of the present example, the second rake angle θ2 is smaller than the first rake angle θ1, and the third rake angle θ3 is smaller than the second rake angle θ2. Thus, a large angle is likely to be formed between the third surface region 83 and the flute 90, whereby the twisting of the chips in the portion around the outer peripheral of the insert 1 is further facilitated.

In other words, the insert 1 of the present example can be regarded having the following configuration.

The main body 2 includes the rake face 80 extending from the cutting edge 11 toward the second end 3A and the flute 90 extending from the rake face 80 toward the second end 3A. A region of the flute 90 on the side of the first end 10A has a shape convex toward the rake face 80. Thus, the boundary 98 between the rake face 80 and the flute 90 has a shape convex toward the first end 10A (side of the first end 10A).

The rake angle of the rake face 80 is smaller at a portion as separating from the cutting edge 11. A rake angle in a region (third surface region 83) of the rake face sandwiched between the flute 90 and the ridge L1 is smaller than a rake angle in a region (the first surface region 81 and the second surface region 82) closer to the first end 10A than the flute 90 in the rake face.

The main body 2 may further include the contact surface 20. The contact surface 20 may be positioned frontward in the rotational direction R2 with respect to the flute 90, and may come into contact with the holder 102 when the insert 1 is attached to the holder 102 described below. A rake angle in a region (fourth surface region 84) of the rake face between the flute 90 and the contact surface 20 may be smaller than a rake angle in a region (the first surface region 81 and the second surface region 82) closer to the first end 10A than the flute 90 is in the rake face.

The insert 1 may have a shape with the boundary 98 between the rake face 80 and the flute 90 protruding toward the first end 10A in side view. In other words, the boundary 98 may be convex toward the first end 10A (side of the first end 10A). Part of the flute 90 protruding toward the first end 10A side is referred to as a protruding groove part 91. With this configuration, the distance from the main cutting edge 18 to the flute 90 can be made short. Thus, the chips, flowing in a portion of the boundary 98 serving as the boundary between the second surface region 82 and the flute 90 (in other words, the chips flowing between the third surface region 83 and the fourth surface region 84), can easily flow toward the flute 90.

In the insert 1, in a cross section (cross section illustrated in FIG. 9 for example) that is orthogonal to the rotational axis R1 and crosses the flute 90, the third surface region 83, and the fourth surface region 84, the third surface region 83 and the fourth surface region 84 may have a portion where the fourth surface region 84 has a width W4 that is larger than a width W3 of the third surface region 83. This width W4 of the fourth surface region 84 is a length of a straight line connecting two end portions of the fourth surface region 84 in cross-sectional view (both ends of a curved line corresponding to the fourth surface region 84 in the cross-sectional view). The width W3 of the third surface region 83 is a length of a straight line connecting two end portions of the third surface region 83 in cross-sectional view (both ends of a curved line corresponding to the third surface region 83 in the cross-sectional view) (see FIGS. 9 and 10).

With this configuration, the dischargeability of the chips is improved. The chips flowing from the rake face 80 to the flute 90 are likely to flow in a biased manner rearward in the rotational direction R2 of the rake face 80 and the flute 90. Since the flute 90 is biased rearward in the rotational direction R2 of the rake face 80 and the flute 90, the chips thus flowing are likely to flow to the flute 90.

As illustrated in FIG. 9, in the boundary 98 between the rake face 80 and the flute 90, the flute 90 may be recessed with respect to the rake face 80. With this configuration, intense contact is less likely to occur between the chips and the flute 90 when the chips flow from the rake face 80 to the flute 90. Thus, the dischargeability of the chips is improved, while reducing the chance of the flute 90 wearing.

In the insert 1, in a first cross section (the cross section illustrated in FIG. 8 for example) that is orthogonal to the rotational axis R1 and crosses the rake face 80, the rake face 80 may have a concavely curved shape, and in a second cross section (the cross section illustrated in FIG. 9 for example) orthogonal to the rotational axis R1 and crosses the flute 90, the flute 90 may have a concavely curved shape. A radius of curvature RC2 of the flute 90 in the second cross section may be smaller than a radius of curvature RC1 of the rake face 80 in the first cross section. In other words, the radius of curvature RC2 of the flute 90 in the second cross section may be smaller than the radius of curvature RC1 of the second surface region 82 in the first cross section.

This configuration facilitates reduction of the area of contact between the chips and the flute 90 when the chips flow from the rake face 80 to the flute 90. Specifically, when the chips flow from the rake face 80 to the flute 90, at least part of the chips is likely to flow while being separated from the flute 90. Thus, the dischargeability of the chips is improved, while reducing the chance of the flute 90 wearing.

In other words, the insert 1 of the present example can be regarded having the following configuration.

The main body 2 includes the rake face 80 extending from the cutting edge 11 toward the second end 3A and the flute 90 extending from the rake face 80 toward the second end 3A. A region of the flute 90 on the side of the first end 10A has a shape convex toward the rake face 80. Thus, the boundary 98 between the rake face 80 and the flute 90 has a shape convex toward the first end 10A.

The rake angle of the rake face 80 is smaller at a portion as separating from the cutting edge 11. A rake angle in a region (third surface region 83) of the rake face sandwiched between the flute 90 and the ridge L1 is smaller than a rake angle in a region (the first surface region 81 and the second surface region 82) closer to the first end 10A than the flute 90 in the rake face.

The main body 2 may further include the contact surface 20. The contact surface 20 may be positioned frontward in the rotational direction R2 with respect to the flute 90, and may come into contact with the holder 102 when the insert 1 is attached to the holder 102 described below. A rake angle in a region (fourth surface region 84) of the rake face between the flute 90 and the contact surface 20 may be smaller than a rake angle in a region (the first surface region 81 and the second surface region 82) closer to the first end 10A than the flute 90 in the rake face.

4. Surface Region of Rake Face

Whether the rake face 80 has the first surface region 81, the second surface region 82, and the third surface region 83 may be evaluated through the following procedure.

FIG. 7 is a cross-sectional view illustrating a cross section that is orthogonal to the cutting edge 11, is parallel to the rotational axis R1, and passes through part of the rake face 80 sandwiched between the flute 90 and the ridge L1, in the insert 1 as viewed from the first end 10A side. In this cross section, part of the rake face 80 that is positioned on the first end 10A side and is connected to the cutting edge 11 is defined as the first surface region 81. The rake angle at part of the first surface region 81 connected to the cutting edge 11 is defined as the first rake angle θ1.

In the cross section described above, part of the rake face 80 that is positioned on the second end 3A side and is sandwiched between the flute 90 and the ridge L1 is defined as the third surface region 83. The rake angle at part of the third surface region 83 connected to the flute 90 is defined as the third rake angle θ3.

When a surface region is present between the first surface region 81 and the third surface region 83, with a rake angle smaller than the first rake angle θ1 and larger than the third rake angle θ3, this surface region may be regarded as the second surface region 82.

Whether the rake face 80 has the first surface region 81, the second surface region 82, and the fourth surface region 84 may be evaluated through the following procedure.

FIG. 5 is a cross-sectional view illustrating a cross section that is orthogonal to the cutting edge 11, is parallel to the rotational axis R1, and passes through part of the rake face 80 sandwiched between the flute 90 and the contact surface 20, in the insert 1 as viewed from the first end 10A side. In this cross section, part of the rake face 80 that is positioned on the first end 10A side and is connected to the cutting edge 11 is defined as the first surface region 81. The rake angle at part of the first surface region 81 connected to the cutting edge 11 is defined as the first rake angle θ1. In the cross section described above, part of the rake face 80 that is positioned on the second end 3A side and is sandwiched between the flute 90 and the contact surface 20 is defined as the fourth surface region 84.

When a surface region is present between the first surface region 81 and the fourth surface region 84, with a smaller rake angle than the first rake angle θ1, this surface region may be regarded as the second surface region 82.

4. Configuration of Rotary Tool

Figure 11:
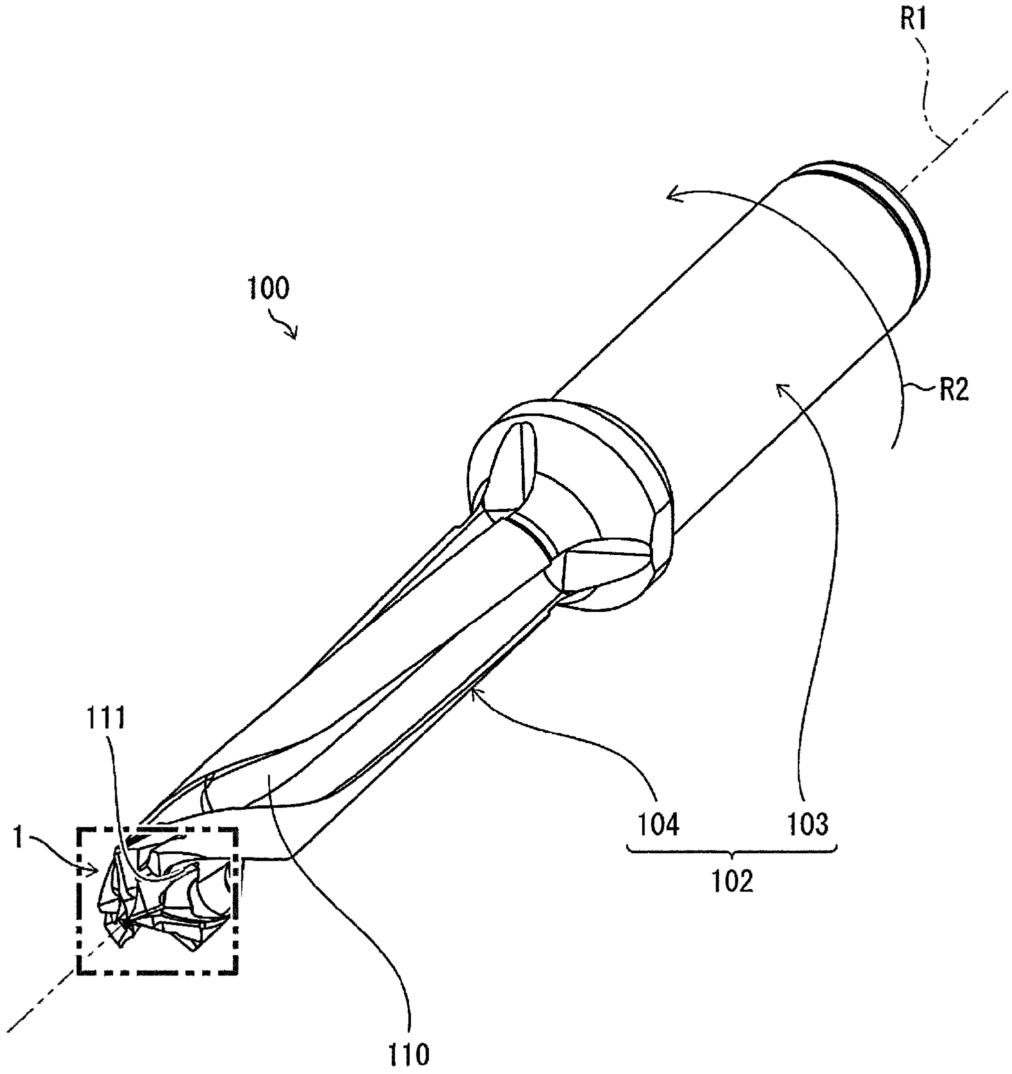
FIG. 11 is a perspective view illustrating a rotary tool of a non-limiting embodiment of the present disclosure.
Figure 12:
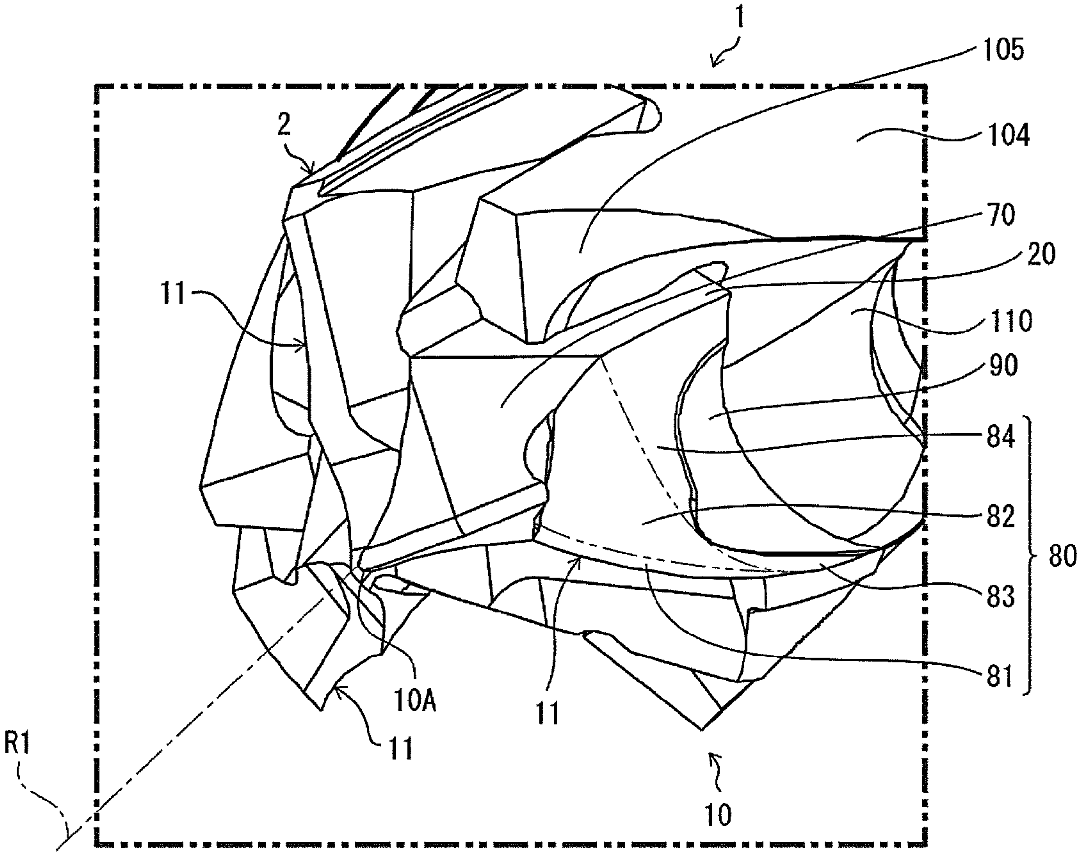
FIG. 12 is an enlarged view of a leading end portion on a first end side of the rotary tool illustrated in FIG. 11.

A rotary tool 100 of one non-limiting example of the present disclosure will be described with reference to FIGS. 11 and 12. FIG. 11 is a perspective view of the rotary tool 100. FIG. 12 is an enlarged view of a leading end portion of the rotary tool 100 on the first end 10A side.

As illustrated in FIGS. 11 to 12, the rotary tool 100 of one example is a so-called insert-type drill, having the insert 1 and the holder 102 formed as separate members, and having the insert 1 attached to a leading end portion of the holder 102. The rotary tool 100 has the rotational axis R1, and rotates about the rotational axis R1.

While the rotary tool 100 of the present example is a single-chip type drill to which one insert 1 is attached, but the rotary tool including the insert 1 is not limited to the single-chip type drill. The rotary tool is not limited to a drill that performs drilling by moving in the direction of the rotational axis R1 relative to the workpiece, and may be a tool that can rotate and cut the workpiece by moving in any direction while rotating. Examples of the rotary tool including the insert 1 include an endmill, and a milling tool.

The holder 102 may include a shank 103 and a body 104 extending along the rotational axis R1. The shank 103 may have a rod shape extending along the rotational axis R1, and is a portion held by a machine tool for example.

The body 104 has a side surface provided with a flute 110 formed in a helical shape for discharging chips from a workpiece T.

The body 104 includes the pocket 111 opening on the leading end side. The shaft portion 3 of the insert 1 is attached to the pocket 111. The insert 1 is attached to the holder 102 (body 104), for example, using a screw (not illustrated).

The body 104 has the leading end, on the insert 1 side, provided with a fix claw 105 with which the insert 1 can be fixed. One of a plurality of surfaces of the fix claw 105 comes into contact with the contact surface 20 of the insert 1. The flute 110 is connected to the flute 90 of the insert 1.

Method for Manufacturing Machined Product

Figure 13:
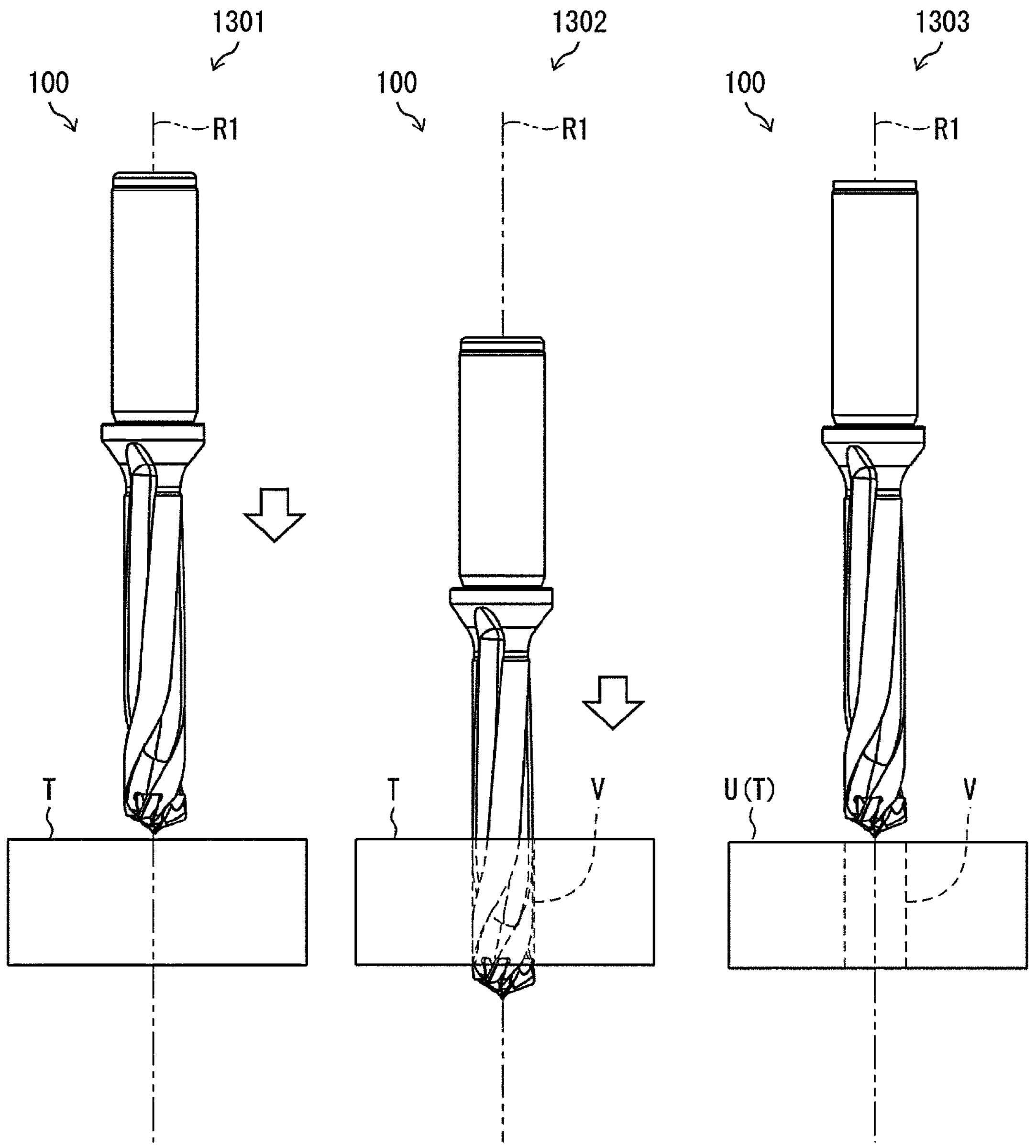
FIG. 13 is a schematic diagram illustrating an example of a step of a method for manufacturing a machined product of a non-limiting embodiment of the present disclosure.

Description will be given of a method for manufacturing a machined product according to an example by using FIG. 13. FIG. 13 is a schematic diagram illustrating a step of a method for manufacturing a machined product of an embodiment. A method for manufacturing a machined product U by machining the workpiece T using the rotary tool 100 will be described below.

The method for manufacturing the machined product U according to one embodiment of the present disclosure may include the following steps. Specifically, the steps may include:

(1) rotating the rotary tool 100;

(2) bringing the rotary tool 100 into contact with the workpiece T; and (3) separating the rotary tool 100 from the workpiece T.

More specifically, first of all, as indicated by the reference numeral 1301 in FIG. 13, the workpiece T is prepared directly below the rotary tool 100, and the rotary tool 100 attached to the machine tool is rotated about the rotational axis R1. Examples of the workpiece T include aluminum, carbon steel, alloy steel, stainless steel, cast iron, and non-ferrous metals.

As indicated by the reference numeral 1302 in FIG. 13, the rotary tool 100 and the workpiece T are moved toward each other, to bring the rotary tool 100 into contact with the workpiece T. Thus, the workpiece T is machined by the cutting edge 11 of the insert 1, whereby a processed hole V is formed. The chips from the workpiece T machined pass through the flute 110 of the holder 102 from the flutes 90 of the insert 1 and are discharged to the outside. The rotary tool 100 and the workpiece T may be relatively moved toward each other in any manner that is not particularly limited. For example, the rotary tool 100 may be moved toward the workpiece T fixed, or the workpiece T may be moved toward the rotating rotary tool 100 fixed.

Then, as indicated by the reference numeral 1303 in FIG. 13, the rotary tool 100 is separated from the workpiece T. As a result, the machined product U is manufactured as the workpiece T in which the processed hole V has been formed.

Variation (a) In the above embodiment, a description has been given on the rotary tool 100 of a so-called insert type configured by a combination of the insert 1 and the holder 102. However, the configuration of the rotary tool 100 is not limited to this, and may be a so-called solid type rotary tool in which, for example, the insert 1 and the holder 102 are integrally formed.

(b) In the insert 1, on the rake face 80, a clear distinctive boundary or a vague boundary may be provided between adjacent ones of the first surface region 81 to the fourth surface region 84. Thus, the insert 1 may not have the distinctive boundary 12 and boundary 23.

Supplementary Note

In the present disclosure, the invention has been described above based on the various drawings and examples. However, the invention according to the present disclosure is not limited to each embodiment described above. That is, the embodiments of the invention according to the present disclosure can be modified in various ways within the scope illustrated in the present disclosure, and embodiments obtained by appropriately combining the technical means disclosed in different embodiments are also included in the technical scope of the invention according to the present disclosure. In other words, note that a person skilled in the art can easily make various variations or modifications based on the present disclosure. Note that these variations or modifications are included within the scope of the present disclosure.

REFERENCE SIGNS

1 Insert
2 Main body
3 Shaft portion
10 Cutting portion
11 Cutting edge
16 Chisel edge
17 Thinning edge
18 Main cutting edge
20 Contact surface
70 Thinning surface
80 Rake face
81 First surface region
82 Second surface region
83 Third surface region
84 Fourth surface region
90, 110 Flute
91 Protruding groove part
12, 23, 98 Boundary
100 Rotary tool
102 Holder
103 Shank
104 Body
105 Fix claw
111 Pocket
RC1, RC2 Radius of curvature
θ1 First rake angle
θ2 Second rake angle
θ3 Third rake angle
R1 Rotational axis
R2 Arrow (rotational direction)
Y1 Virtual straight line

The invention claimed is:

1. A cutting insert, comprising:
a main body extending from a first end toward a second end along a rotational axis, wherein
the main body comprises
a cutting edge positioned on a side of the first end,
a rake face extending from the cutting edge toward the second end, and
a flute extending from the rake face toward the second end,
the rake face comprises
a first surface region connected to the cutting edge and having a first rake angle,
a second surface region positioned closer to the second end than the first surface region and having a second rake angle, and
a third surface region positioned closer to the second end than the second surface region and having a third rake angle,
the flute is positioned closer to the second end than the second surface region,
the third surface region is adjacent to the flute rearward in a rotational direction about the rotational axis and on a side of an outer peripheral of the main body,
the second rake angle is smaller than the first rake angle,
the third rake angle is smaller than the second rake angle, and
at a boundary between the rake face and the flute, the flute is recessed with respect to the rake face.

2. The cutting insert according to claim 1, wherein,
in a side view of the cutting insert, the boundary between the rake face and the flute is convex toward the first end.

3. The cutting insert according to claim 1, wherein
the rake face further comprises a fourth surface region adjacent to the flute frontward in the rotational direction about the rotational axis, the fourth surface region being positioned closer to the second end than the second surface region, and
in a cross section orthogonal to the rotational axis and crossing the flute, the third surface region, and the fourth surface region,
each of the third surface region and the fourth surface region comprises a portion, and
the portion of the fourth surface region has a width larger than a width of the portion of the third surface region.

4. The cutting insert according to claim 1, wherein
the rake face has a concavely curved shape in a first cross section orthogonal to the rotational axis and crossing the rake face,
the flute has a concavely curved shape in a second cross section orthogonal to the rotational axis and crossing the flute, and
a radius of curvature of the flute in the second cross section is smaller than a radius of curvature of the rake face in the first cross section.

5. A rotary tool, comprising:
a holder comprising a pocket positioned on a leading end side; and
the cutting insert according to claim 1, positioned in the pocket.

6. A method for manufacturing a machined product, the method comprising:
rotating the rotary tool according to claim 5;
bringing the rotary tool that is rotating into contact with a workpiece; and
separating the rotary tool from the workpiece.

7. A cutting insert, comprising:
a main body extending from a first end toward a second end along a rotational axis, wherein
the main body comprises
a cutting edge positioned on a side of the first end,
a rake face extending from the cutting edge toward the second end, and a flute extending from the rake face toward the second end, the rake face comprises a first surface region connected to the cutting edge and having a first rake angle, a second surface region positioned closer to the second end than the first surface region and having a second rake angle, and a third surface region positioned closer to the second end than the second surface region and having a third rake angle, the flute is positioned closer to the second end than the second surface region, the third surface region is adjacent to the flute rearward in a rotational direction about the rotational axis and on a side of an outer peripheral of the main body, the second rake angle is smaller than the first rake angle, the third rake angle is smaller than the second rake angle, and in a side view of the cutting insert, a boundary between the rake face and the flute is convex toward the first end.

8. The cutting insert according to claim 7, wherein at the boundary between the rake face and the flute, the flute is recessed with respect to the rake face.

9. The cutting insert according to claim 7, wherein the rake face further comprises a fourth surface region adjacent to the flute frontward in the rotational direction about the rotational axis, the fourth surface region being positioned closer to the second end than the second surface region, and in a cross section orthogonal to the rotational axis and crossing the flute, the third surface region, and the fourth surface region, each of the third surface region and the fourth surface region comprises a portion, and the portion of the fourth surface region has a width larger than a width of the portion of the third surface region.

10. The cutting insert according to claim 7, wherein the rake face has a concavely curved shape in a first cross section orthogonal to the rotational axis and crossing the rake face, the flute has a concavely curved shape in a second cross section orthogonal to the rotational axis and crossing the flute, and a radius of curvature of the flute in the second cross section is smaller than a radius of curvature of the rake face in the first cross section.

11. A rotary tool, comprising:

a holder comprising a pocket positioned on a leading end side; and the cutting insert according to claim 7, positioned in the pocket.

12. A method for manufacturing a machined product, the method comprising:

rotating the rotary tool according to claim 11;

bringing the rotary tool that is rotating into contact with a workpiece; and separating the rotary tool from the workpiece.

* * * * *